(12) United States Patent
Ma et al.

(10) Patent No.: US 11,851,147 B2
(45) Date of Patent: Dec. 26, 2023

(54) SPATIO-TEMPORAL DP METHOD BASED ON SHIP TRAJECTORY CHARACTERISTIC POINT EXTRACTION

(71) Applicant: WUHAN UNIVERSITY OF TECHNOLOGY, Hubei (CN)

(72) Inventors: Yong Ma, Hubei (CN); Haiyang Jiang, Hubei (CN); Xinping Yan, Hubei (CN)

(73) Assignee: WUHAN UNIVERSITY OF TECHNOLOGY, Hubei (CN)

( * ) Notice: Subject to any disclaimer, the term of this patent is extended or adjusted under 35 U.S.C. 154(b) by 255 days.

(21) Appl. No.: 17/615,111

(22) PCT Filed: Aug. 11, 2021

(86) PCT No.: PCT/CN2021/112036
§ 371 (c)(1),
(2) Date: Nov. 30, 2021

(87) PCT Pub. No.: WO2022/252398
PCT Pub. Date: Dec. 8, 2022

(65) Prior Publication Data
US 2023/0118438 A1 Apr. 20, 2023

(30) Foreign Application Priority Data

May 31, 2021 (CN) .......................... 202110601140.4

(51) Int. Cl.
*G08G 3/02* (2006.01)
*B63B 79/40* (2020.01)
*G05D 1/02* (2020.01)

(52) U.S. Cl.
CPC ........... *B63B 79/40* (2020.01); *G05D 1/0206* (2013.01); *G08G 3/02* (2013.01)

(58) Field of Classification Search
CPC .......... G08G 3/00; G08G 3/02; G05D 1/0206; B63B 79/40; G01C 21/203
See application file for complete search history.

(56) References Cited

U.S. PATENT DOCUMENTS

| 9,727,976 B1* | 8/2017 | Perkins | G06V 20/13 |
| 10,048,075 B2* | 8/2018 | Wang | G01C 21/20 |
| 2020/0272641 A1* | 8/2020 | Winn | G06F 16/2455 |

FOREIGN PATENT DOCUMENTS

CN 110990504 A 4/2020

OTHER PUBLICATIONS

Li et al., A trajectory simplification method based on the clustering of vessel speed and course segments, 2020, IEEE, p. 558-562 (Year: 2020).*

(Continued)

*Primary Examiner* — McDieunel Marc
(74) *Attorney, Agent, or Firm* — True Shepherd LLC; Andrew C. Cheng

(57) ABSTRACT

A spatio-temporal DP method based on ship trajectory characteristic point extraction, which belongs to the technical field of ship trajectory compression and includes: Step 1: performing clustering analysis on AIS raw data using a clustering algorithm to identify outliers in the AIS data and then eliminate noise points; Step 2: identifying and retaining the characteristic trajectory points of the ship course change, ship speed change, and the ship entering and exiting from a certain area and the like; Step 3: compressing the AIS data by taking the start and end points of the ship trajectory and the characteristic trajectory points retained in step 2 as the initial points, and considering the spatio-temporal characteristics of the AIS data at the same time. The compressed ship can effectively compress redundant AIS data. The compressed ship trajectory has very little difference from the original trajectory, can retain the information of points of the (Continued)

ship motion state change and the points of the ship entering and exiting from the boundary of an area at the same time, has a large reuse value space, and is used for laving the foundation of data processing for ship historical data analysis and ship behavior recognition.

5 Claims, 5 Drawing Sheets

(56) References Cited

OTHER PUBLICATIONS

Junfu et al., Design of Ship Trajectory Analysis and Application System Based on AIS, 2019, IEEE, p. 57-61 (Year: 2019).*
Makris et al., A Comparison of Trajectory Compression Algorithms Over AIS Data, 2020, IEEE, p. 92516-92530 (Year: 2020).*
Li et al., Spatio-Temporal Vessel Trajectory Smoothing Based on Trajectory Similarity and Two-Dimensional Wavelet Transform, 2019, IEEE, p. 1500-1505 (Year: 2019).*
Chen Peng, Chinese Doctoral Dissertations & Master's Theses Full-text Database(Doctor), Research on the Knowledge Base of Ship Collision Avoidance Based on HSSVM and Convolutional Neural Networks, Engineering Science and Technology II , 2014, pp. 31-41, Issue 4, China.

* cited by examiner (a)

(b)

SPATIO-TEMPORAL DP METHOD BASED ON SHIP TRAJECTORY CHARACTERISTIC POINT EXTRACTION

CROSS-REFERENCE TO RELATED APPLICATION

This application is a 371 of international application of PCT application serial no. PCT/CN2021/112036, filed on Aug. 11, 2021, which claims the priority benefit of China application no. 202110601140.4, filed on Mar. 31, 2021. The entirety of each of the above mentioned patent applications is hereby incorporated by reference herein and made a part of this specification.

TECHNICAL FIELD

The present disclosure belongs to the technical field of ship trajectory compression, and more particularly, relates to a spatio-temporal Douglas-Peucker (DP) method based on ship trajectory characteristic point extraction.

BACKGROUND TECHNIQUE

After years of construction, a ship automatic identification system (AIS) base station network framework has been basically formed currently. Maritime agencies can obtain massive ship AIS trajectory data through the AIS information collection system which receives shipborne AIS data collected by the AIS receiving points of various ports in real time. The massive ship AIS trajectory data contains a lot of information, including static information and dynamic information of the ship, human factors of a deck officer, ship collision avoidance behaviors, the usual practice of crews, and the accustomed route. Through the analysis and research of the ship trajectory, effective and potential information that can reflect the law of the ship can be obtained, and then effective data support is provided for the maritime agencies to supervise the violation of the ship, revise the navigation rules, and implement the ship routing system. However, there are some data points with very low utility value in the massive AIS data. After these data points are removed, the ship trajectory will not change significantly. Therefore, in order to improve the efficiency of data utilization, it is necessary to compress the redundant ship AIS trajectory data.

Conventional ship trajectory compression algorithms often only consider the distance offset of the trajectory to compress the trajectory, and the obtained trajectory often ignores the dynamic information of the ship. The characteristic points of ship speed and course change, and tracks entering and exiting the boundary of a certain area are discarded in the compression process, so that the utility value of data is reduced; a few compression algorithms retain the ship trajectory characteristic points through the average values of the course change rate and speed change rate, but ignore that due to sensor errors, the speed and course will fluctuate in a small range, and the fluctuation points will be retained, and too many data points are retained after compression; a few compression algorithms consider the spatio-temporal characteristics of the ship, but often only use the time characteristics of the ship as an index for classification and sorting.

SUMMARY OF THE INVENTION

In view of the above shortcomings or improvement needs of the prior art, the present disclosure provides a spatio-temporal DP method based on ship trajectory characteristic point extraction, which makes up for the shortcomings of the current ship trajectory compression method and achieves the goal of retaining characteristic trajectory points in the process of ship trajectory compression. At the same time, the shape of the trajectory is better retained by considering the spatio-temporal characteristics of AIS data.

In order to achieve the above object, the present disclosure provides a spatio-temporal DP method based on ship trajectory characteristic point extraction, including:

(1) performing clustering analysis on AIS raw data to identify outliers in the AIS data and then eliminate noise points to construct a single-ship AIS time series data record;

(2) converting the latitude and longitude coordinates of each AIS data point in the single-ship AIS time series data record into Mercator projection coordinates;

(3) obtaining the speed change rate and course change rate of each AIS data point, as well as the average speed change rate and average course change rate during the entire navigation process;

(4) identifying and retaining ship course and speed change points in the single-ship AIS time series data record;

(5) identifying and retaining trajectory points of a ship entering and exiting from a certain area in the single-ship AIS time series data record; and (6) compressing the AIS data by taking the start and end points of the ship trajectory, the retained ship course and speed change points, and trajectory points of the ship entering and exiting from a certain area as the initial points, and considering the spatio-temporal characteristics of the AIS data.

In some alternative embodiments, the speed change rate $S_{cri}$ of the ith AIS data point is obtained from $$S_{cri} = \frac{|S_i^{out} - S_i^{in}|}{\Delta t},$$

and the course change rate $C_{cri}$ of the ith AIS data point is obtained from $$C_{cri} = \frac{|C_i^{out} - C_i^{in}|}{\Delta t},$$

the average speed change rate $\overline{S_{cr}}$ during the entire navigation process is obtained from $$\overline{S_{cr}} = \frac{1}{n-2}\sum_{i=2}^{n-1} S_{cri},$$

the average course change rate $\overline{C_{cr}}$ during the entire navigation process is obtained from $$\overline{C_{cr}} = \frac{1}{n-2}\sum_{i=2}^{n-1} C_{cri},$$

$S_i^{out}$ represents the speed of the i+1th AIS data point, $S_i^{in}$ represents the speed of the i−1th AIS data point, $C_i^{out}$ represents the course of the i+1th AIS data point, and $C_i^{in}$ represents the course of the i−1th AIS data point, Δt represents the time interval between the i+1th AIS data point and the i−1th AIS data point, and n represents the number of AIS data points.

In some alternative embodiments, step (4) includes:

setting that the ship speed change threshold $S_{tre}=M \times \overline{S_{cr}}$, judging whether the speed change rate $S_{cri}$ of each AIS data point $B_i$ is greater than $S_{tre}$ in turn; and determining that a speed change point set $S=S \cup B_i$ if $S_{cri} \geq S_{tre}$; and setting that the ship course change threshold $C_{tre}=N \times \overline{C_{cr}}$, judging whether the course change rate $C_{cri}$ of each AIS data point $P_i$ is greater than $C_{tre}$ in turn; and determining that a course change point set $C=C \cup P_i$ if $C_{cri} \geq C_{tre}$, wherein M and N represent coefficients.

In some alternative embodiments, step (5) includes:

judging whether the product of values after two adjacent AIS data points are respectively substituted into an area boundary line equation is less than 0; and marking and retaining the two adjacent AIS data points as the trajectory points of the ship entering and exiting from a certain area, which constitute a certain-area entry and exit point set E if the product is less than 0.

In some alternative embodiments, step (6) includes:

(6.1) setting a distance threshold $d_T$, and marking the trajectory in segments with the start and end points of the ship trajectory and the retained characteristic trajectory points in S, E and C as the initial points, wherein the trajectory between two adjacent trajectory characteristic points is one sub-trajectory segment;

(6.2) connecting the start and end points of each segmented trajectory, and establishing a virtual straight line spatio-temporal trajectory according to the coordinates of the Mercator coordinate system converted from the longitude and latitude of the start and end points, and time; calculating the coordinates of the Mercator coordinate system of an AIS data point on each sub-trajectory segment on a virtual straight line spatio-temporal trajectory at the same moment, taking the distance between the coordinates of the Mercator coordinate system of the AIS data point on the sub-trajectory segment and the coordinates of the Mercator coordinate system of the AIS data point on the virtual straight line spatio-temporal trajectory at the same moment as a spatio-temporal distance d from the AIS data point to the virtual straight line spatio-temporal trajectory, finding the maximum distance $d_{max}$ among all spatio-temporal distances, and comparing the maximum distance with the preset distance threshold $d_T$;

(6.3) discarding all intermediate data points on the sub-trajectory segment if $d_{max} < d_T$, and taking a straight line connecting the start and end points of the sub-trajectory segment as the approximation of the sub-trajectory segment after all the intermediate points are discarded, thus completing the processing of the sub-trajectory segment;

(6.4) retaining the AIS data point corresponding to the maximum distance as the data point on the result trajectory if $d_{max} > d_T$, dividing the sub-trajectory segment into two parts by the AIS data point corresponding to the maximum distance, and processing the two parts of curves using step (6.2) and step (6.3) until all $d_{max} < d_T$; and (6.5) forming a trajectory by sequentially connecting the segmentation points after all the sub-trajectory segments are processed, wherein the trajectory is an approximate trajectory after the original trajectory is compressed.

In some alternative embodiments, the latitude and longitude coordinates of each AIS data point in the single-ship AIS time series data record are converted into Mercator projection coordinates by $$r_0 = \frac{a \times \cos(\varphi_0)}{\sqrt{1-(e^2 \times \sin^2(\varphi_0))}}, \quad q = \ln\left(\tan\left(\frac{\pi}{4} + \frac{\varphi}{2}\right) \times \left(\frac{1-e \times \sin\varphi}{1+e \times \sin\varphi}\right)^{e/2}\right),$$

$x=r_0 \times \lambda$ and $y=r_0 \times q$, wherein $(\lambda, \varphi)$ represents the latitude and longitude coordinates of the AIS data point, $r_0$ represents the radius of the parallel circle of the standard latitude, and q represents the equidistant latitude, $\varphi_0$ represents the standard latitude of Mercator projection, a represents the long radius of the earth ellipsoid, e represents the first eccentricity of the earth ellipsoid, and (x, y) represents the coordinates of the Mercator coordinate system converted from latitude and longitude coordinates.

In some alternative embodiments, $M \in [9,11]$, $N \in [3,5]$.

In general, compared with the prior art, the above technical solutions conceived by the present disclosure can achieve the following beneficial effects:

When compressing the ship AIS trajectory, the present disclosure fully considers the retention of characteristic trajectory points, and at the same time, the shape of the trajectory is better retained by compressing the trajectory with the spatio-temporal distance, and the simplified data has greater secondary utility value.

DESCRIPTION OF THE EMBODIMENTS

In order to make the objectives, technical solutions, and advantages of the present disclosure clearer, the present disclosure will be further described in detail with reference to the accompanying drawings and embodiments. It should be understood that the specific embodiments described here are only used to explain the present disclosure, but not to limit the present disclosure. In addition, the technical characteristics involved in the various embodiments of the present disclosure described below can be combined with each other as long as they do not conflict with each other.

Figure 1:
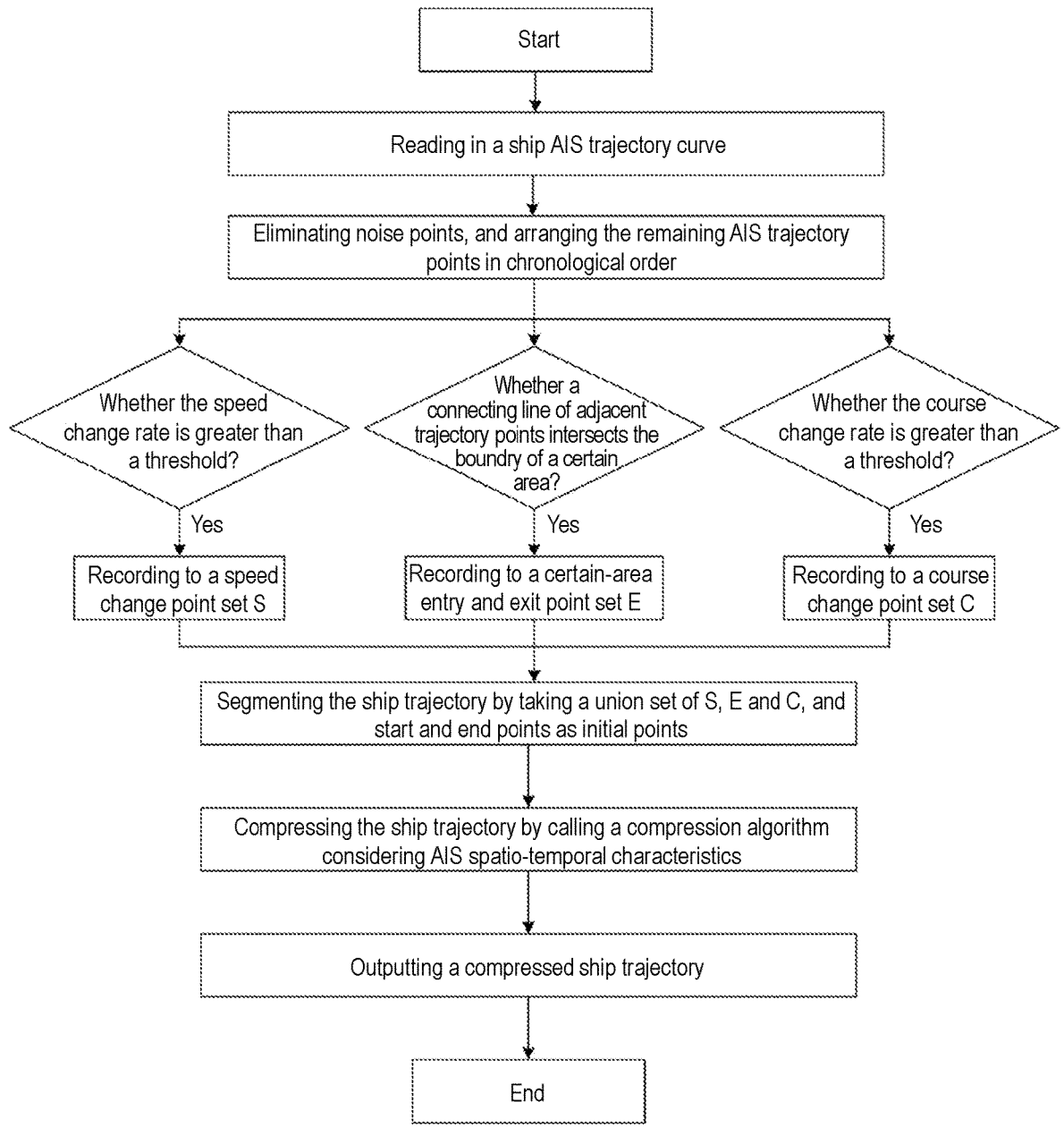
FIG. 1 is a flowchart of ship trajectory compression provided by an embodiment of the present disclosure.

In this embodiment, AIS data collected from the Wuhan section of the Yangtze River on Aug. 9, 2016 is used as the original data for compression. As shown in FIG. 1, the technical solution adopted by the present disclosure is:

S1: eliminating noise points: performing clustering analysis on AIS raw data using a clustering algorithm to identify outliers in the AIS data and then eliminate noise points to construct a single-ship AIS time series data record;

in this example, the noise points of the ship's position are mainly eliminated. After the data points with large position deviation are eliminated, a single-ship AIS time series data record is constructed.

S2: converting the latitude and longitude coordinates of each AIS data point in the single-ship AIS time series data record into Mercator projection coordinates to facilitate distance calculation;

$$r_0 = \frac{a \times \cos(\varphi_0)}{\sqrt{1-(e^2 \times \sin^2(\varphi_0))}}$$

$$q = \ln\left(\tan\left(\frac{\pi}{4}+\frac{\varphi}{2}\right) \times \left(\frac{1-e \times \sin\varphi}{1+e \times \sin\varphi}\right)^{e/2}\right)$$

$$x = r_0 \times \lambda$$

$$y = r_0 \times q$$

wherein ($\lambda$, $\varphi$) represents the latitude and longitude coordinates of the AIS data point, $r_0$ represents the radius of the parallel circle of the standard latitude, q represents the equidistant latitude, $\varphi_o$ represents the standard latitude of the Mercator projection, a represents the long radius of the earth ellipsoid, e represents the first eccentricity of the earth ellipsoid, and (x, y) represents the coordinates of the Mercator coordinate system converted from the latitude and longitude coordinates.

In this example, in order to facilitate calculation and improve calculation accuracy, the longitude and latitude coordinates of each AIS data point are uniformly converted into coordinates of the Mercator coordinate system, and the time is uniformly converted to be in seconds.

S3: obtaining the speed change rate and course change rate of each AIS data point, and the average speed change rate and average course change rate during the entire navigation process;

$$S_{cri} = \frac{|S_i^{out} - S_i^{in}|}{\Delta t}$$

$$C_{cri} = \frac{|C_i^{out} - C_i^{in}|}{\Delta t}$$

$$\overline{S_{cr}} = \frac{1}{n-2}\sum_{i=2}^{n-1} S_{cri}$$

$$\overline{C_{cr}} = \frac{1}{n-2}\sum_{i=2}^{n-1} C_{cri}$$

Figure 2:
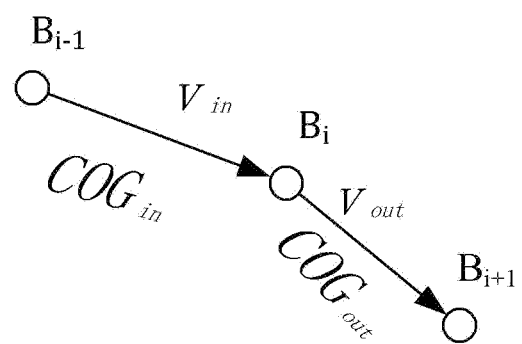
FIG. 2 is a schematic diagram of calculating a speed change rate and a course change rate provided by an embodiment of the present disclosure.

Wherein, $S_{cri}$ and $C_{cri}$ respectively represent the speed change rate and course change rate of the ith AIS data point, $\overline{S_{cr}}$ and $\overline{C_{cr}}$ respectively represent the average speed change rate and the average course change rate during the entire navigation process, $S_i^{out}$ represents the speed of the i+1th AIS data point, $S_i^{in}$ represents the speed of the i−1th AIS data point, $C_i^{out}$ represents the course of the i+1th AIS data point, and $C_i^{in}$ represents the course of the i−1th AIS data point, $\Delta t$ represents the time interval between the i+1th AIS data point and the i−1th AIS data point, and n represents the number of AIS data points, as shown in FIG. 2.

S4: identifying and retaining the ship course and speed change points in the single-ship AIS time series data record;

limited by the accuracy of the sensor, speed and course data of the ship may have small fluctuations. If the average change rate is directly used as the threshold, these fluctuation points may be retained as the trajectory characteristic points of the speed change and course change, resulting in that the data volume after compression is still huge, thus the expansion coefficients M and N are introduced in the present disclosure to expand the average speed change rate and the average course change rate.

Suppose that an initial speed change point set S={}, the ship speed change threshold $S_{tre}=M \times \overline{S_{cr}}$ is set, and whether the speed change rate $S_{cri}$ of each AIS data point $B_i$ is greater than $S_{tre}$ is judged in turn. If $S_{cri} \geq S_{tre}$, then it is determined that a speed change point set S=S∪ $B_i$;

Suppose that an initial course change point set C={}, the ship course change threshold $C_{tre}=N \times \overline{C_{cr}}$ is set, and whether the course change rate $C_{cri}$ of each AIS data point $P_i$ is greater than $C_{tre}$ is judged in turn. If $C_{cri} \geq C_{tre}$, then it is determined that a course change point set C=C∪$P_i$.

Wherein, M∈[9,11], N∈[3,5].

In this example, the speed characteristic points and the course characteristic points are retained by taking M=10 and N=4 for constructing thresholds of the speed change rate and course change rate of the ship.

S5: identifying and retaining the trajectory points of the ship entering and exiting from a certain area in the single-ship AIS time series data record;

most ship trajectory compression algorithms do not retain these points as trajectory characteristic points, but these data points often contain the human factors of a deck officer, the usual practice of the deck officer and the potential information of the accustomed route and have a certain value in use.

Ship entry/exit behaviors include entering/exiting docks, anchorages, bridge area waters, fishing area waters, roundabouts and other closed areas, as well as trajectory points in non-closed areas such as navigation channels, danger lines, and boundary lines, and it is judged whether the product of values after two adjacent AIS data points are respectively substituted into a boundary line equation is less than 0, if the product is less than 0, the two adjacent AIS data points are marked and retained as the trajectory points of the ship entering and exiting a certain area, which constitute a certain-area entry and exit point set E.

In this example, the characteristic points of ships entering/exiting from the Second Yangtze River Bridge in Wuhan are retained.

Figure 3:
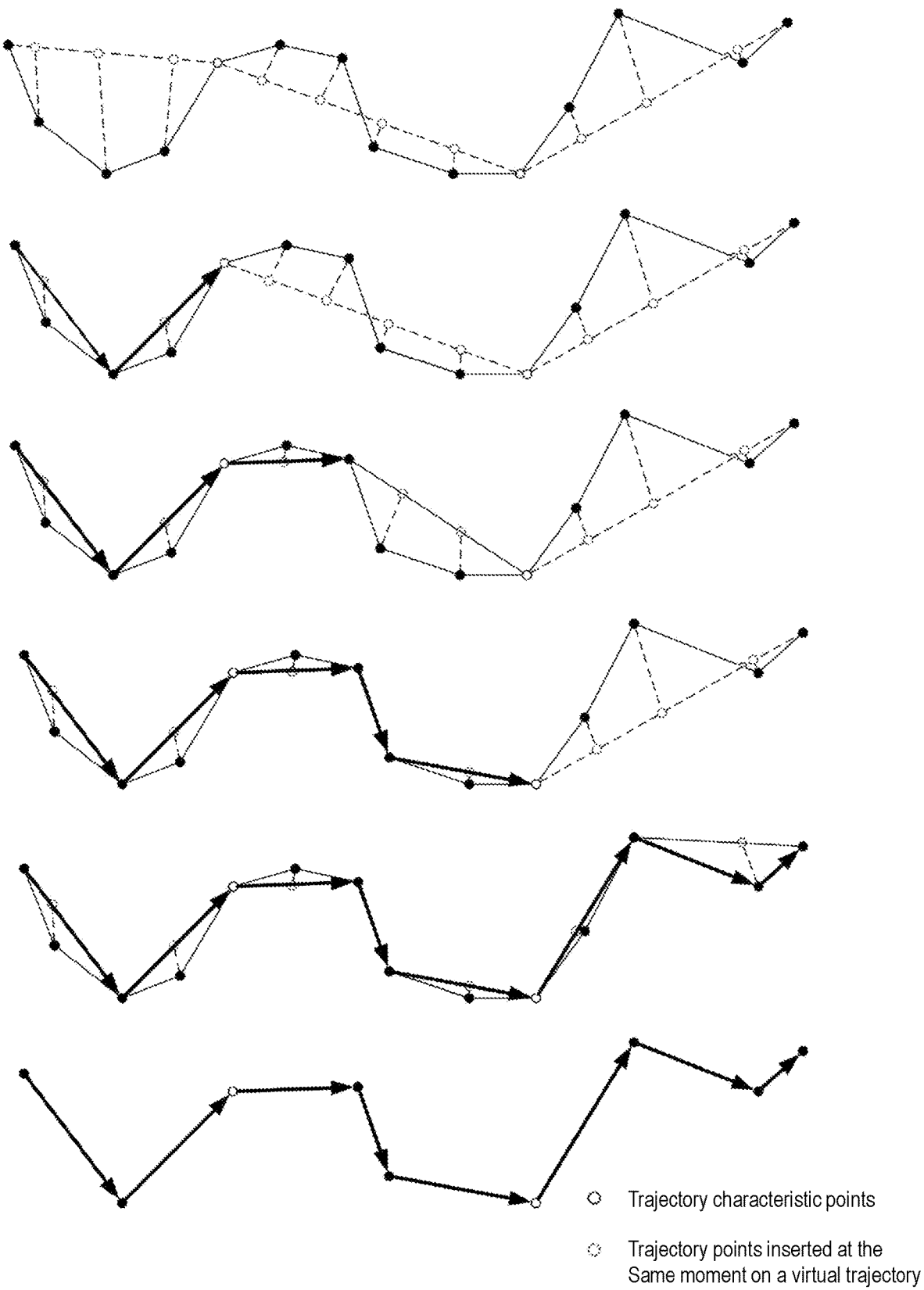
FIG. 3 is a principle diagram of a spatio-temporal DP method based on ship trajectory characteristic point extraction provided by an embodiment of the present disclosure.

S6: compressing a ship trajectory by considering the spatio-temporal characteristics of AIS, specifically, as shown in FIG. 3:

S6.1: setting a distance threshold $d_T$, and marking the trajectory in segments with the start and end points of the ship trajectory and the trajectory characteristic points in S, E and C retained in the above steps as the initial points, wherein the trajectory between two adjacent trajectory characteristic points is one sub-trajectory segment;

S6.2: connecting the start and end points of each segmented trajectory, and establishing a virtual straight line spatio-temporal trajectory according to the coordinates (x, y) of the Mercator coordinate system converted from the longitude and latitude of the start and end points, and time; calculating the coordinates $B'_i(x'_i, y'_i)$ of the Mercator coordinate system of an AIS data point $B_i(x_i,y_i)$ of each sub-trajectory segment on the virtual straight line spatio-temporal trajectory at the same moment, calculating a spatio-temporal distance d from the AIS data point to the virtual straight line spatio-temporal trajectory, i.e., the distance between $B_i$ and $B'_i$, finding the maximum distance $d_{max}$ among all distances, and comparing the maximum distance with the preset distance threshold $d_T$;

$$d=|B_iB'_i|=\sqrt{(x_i-x'_i)^2+(y_i-y'_i)^2}$$

Wherein, $B_i(x_i, y_i)$ is the coordinates in the Mercator coordinate system of the ith AIS data point of the sub-trajectory segment, and $B'_i(x'_i, y'_i)$ is the coordinates in the Mercator coordinate system of $B_i$ on the virtual straight line spatio-temporal trajectory at the same moment.

S6.3: discarding all intermediate data points on the sub-trajectory segment if $d_{max} < d_T$, and taking a straight line connecting the start and end points of the sub-trajectory segment as the approximation of the sub-trajectory segment after all the intermediate points are discarded, thus completing the processing of the sub-trajectory segment;

S6.4: retaining the AIS data point corresponding to the maximum distance as the data point on the result trajectory if $d_{max} > d_T$, dividing the sub-trajectory segment into two parts by the AIS data point corresponding to the maximum distance, and processing the two parts of curves using step (6.2) and step (6.3) until all $d_{max} < d_T$;

S6.5: forming a trajectory by sequentially connecting the segmentation points after all the sub-trajectory segments are processed, wherein the trajectory is an approximate trajectory after the original trajectory is compressed.

Figure 4:
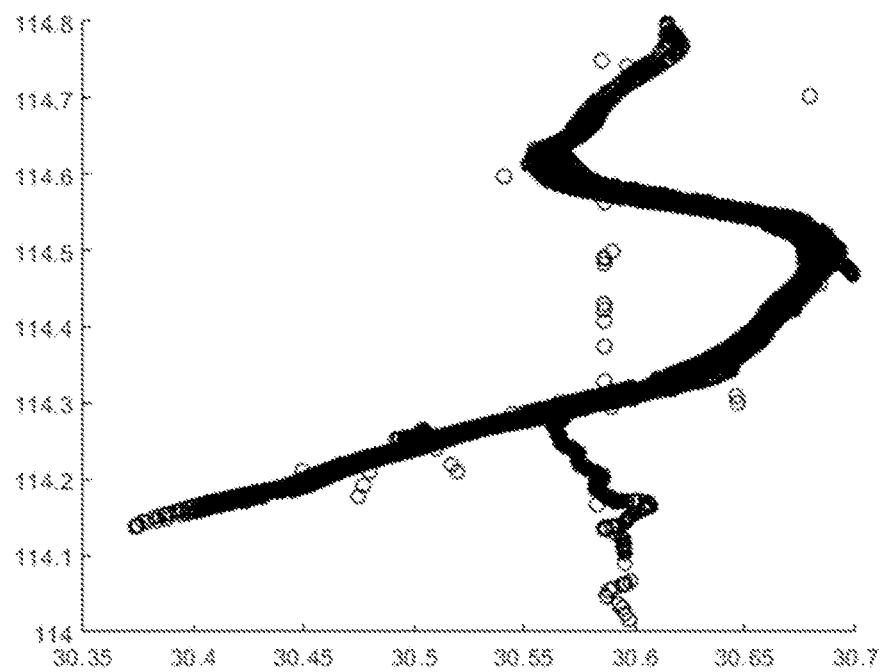
FIG. 4 is a diagram of the overall ship trajectory compression result provided by an embodiment of the present disclosure, wherein (a) represents the original trajectory point diagram, and (b) represents the compressed trajectory point diagram.
Figure 4:
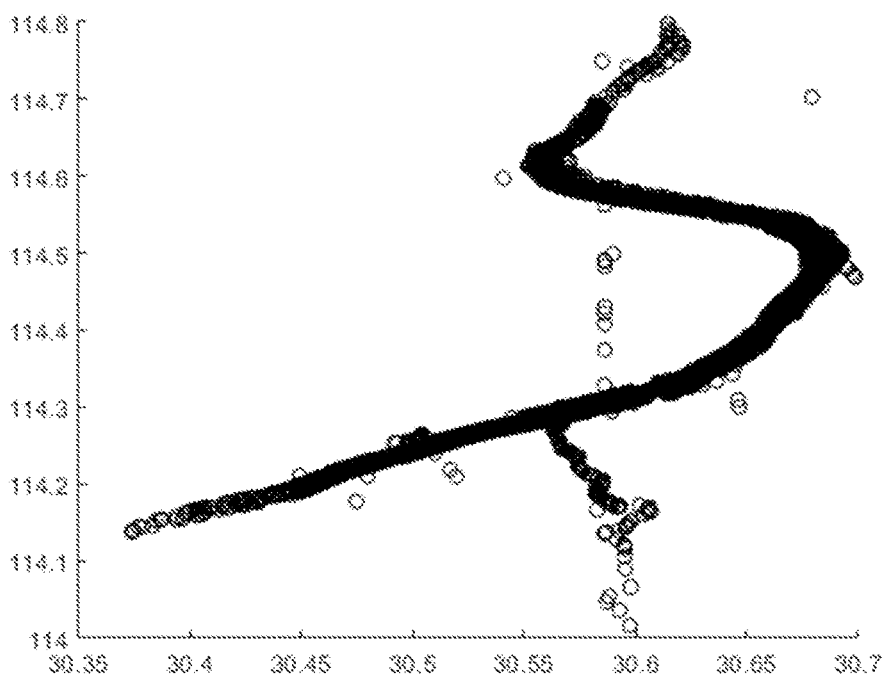
Figure 5:
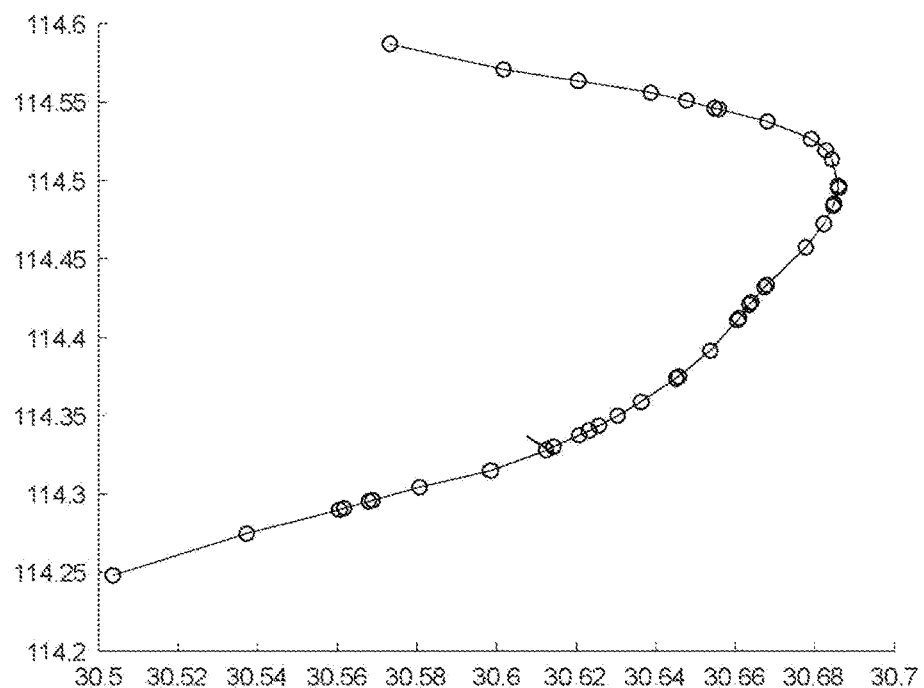
FIG. 5 is a diagram of a single-ship trajectory compression result provided by an embodiment of the present disclosure.
Figure 6:
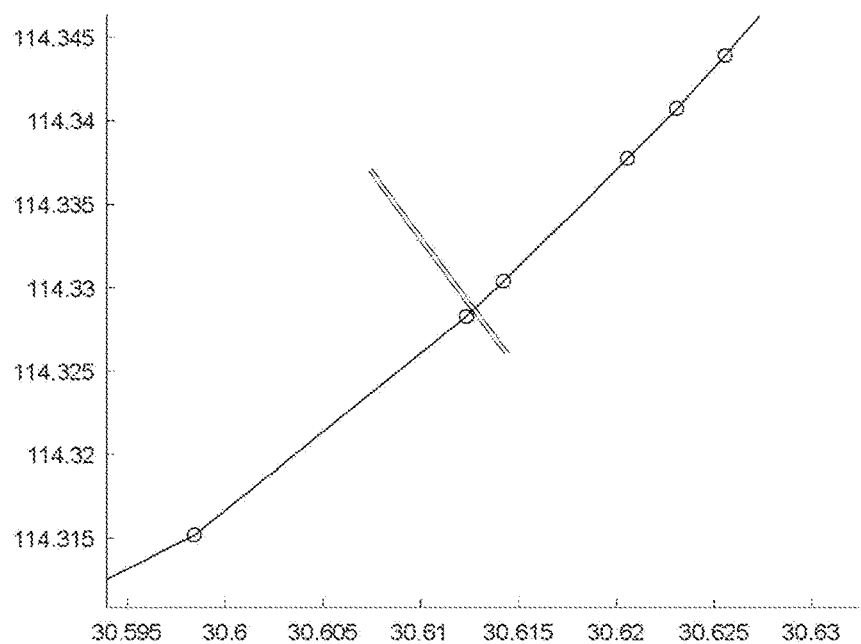
FIG. 6 is characteristic points of entering and exiting from a bridge area provided by an embodiment of the present disclosure.

The overall compression result is shown in FIG. 4. Wherein, (a) in FIG. 4 is the original trajectory point diagram, and (b) in FIG. 4 is the compressed trajectory point diagram. The overall shapes are very similar, which can prove that the method of the present disclosure can retain the shape characteristics of the trajectory while performing high-efficient compression. The results of single-ship trajectory compression are shown in FIG. 5 and FIG. 6, from which it can be seen that the number of trajectory points is small, and the characteristic points are retained relatively complete.

The distance threshold $d_T$ in this example is 80.

It should be pointed out that, steps/components described in this application can be split into more steps/components according to the needs of implementation, or two or more steps/components or partial operations of steps/components can be combined into new steps/components to achieve the purpose of the present disclosure.

Those skilled in the art can easily understand that the above embodiments are only preferred embodiments of the present disclosure and are not intended to limit the present disclosure. Any modification, equivalent replacement and improvement, etc., made within the spirit and principle of the present disclosure should be included in the scope of protection of the present disclosure.

What is claimed is:

1. A spatio-temporal DP (Douglas-Peucker) method based on a ship trajectory characteristic point extraction, comprising:

(1) performing a clustering analysis on a AIS (Automatic Identification system) raw data to identify outliers in a AIS data and then eliminate noise points to construct a single-ship AIS time series data record;

(2) converting latitude and longitude coordinates of each of a plurality of AIS data points in the single-ship AIS time series data record into Mercator projection coordinates;

(3) obtaining a speed change rate and a course change rate of each of the AIS data points, as well as an average speed change rate and an average course change rate during an entire navigation process;

(4) identifying and retaining a ship course and speed change points in the single-ship AIS time series data record;

(5) identifying and retaining trajectory points of a ship entering and exiting from a certain area in the single-ship AIS time series data record; and (6) compressing the AIS data by taking a start point and an end point of a ship trajectory and the retained ship course and the speed change points, and the trajectory points of the ship entering and exiting from the certain area as initial points, and considering spatio-temporal characteristics of the AIS data;

wherein the speed change rate $S_{cri}$ of an ith of the AIS data point is obtained from $$S_{cri} = \frac{|S_i^{out} - S_i^{in}|}{\Delta t},$$

the course change rate $C_{cri}$ of the ith of the AIS data point is obtained from $$C_{cri} = \frac{|C_i^{out} - C_i^{in}|}{\Delta t},$$

the average speed change rate $\overline{S_{cr}}$ during the entire navigation process is obtained from $$\overline{S_{cr}} = \frac{1}{n-2} \sum_{i=2}^{n-1} S_{cri},$$

the average course change rate $\overline{C_{cr}}$ during the entire navigation process is obtained from $$\overline{C_{cr}} = \frac{1}{n-2} \sum_{i=2}^{n-1} C_{cri},$$

represents a speed of an i+1th of the AIS data point, $S_i^{in}$ represents a speed of an i−1th of the AIS data points, $C_i^{out}$ represents a course of the i+1th of the AIS data points, $C_i^{in}$ represents a course of the i−1th of the AIS data points, $\Delta t$ represents a time interval between the i+1th of the AIS data points and the i−1th of the AIS data points, and n represents a number of the AIS data points;

the step (4) comprises:
  setting that a ship speed change threshold $S_{tre} = M \times \overline{S_{cr}}$, judging whether the speed change rate $S_{cri}$ of each of the AIS data points $B_i$ is greater than $S_{tre}$ turn, and determining that a speed change point set $S = S \cup B_i$ under a condition that $S_{cri} > S_{tre}$; and
  setting that a ship course change threshold $C_{tre} = N \times \overline{C_{cr}}$, judging whether the course change rate $C_{cri}$ of each of the AIS data point $P_i$ is greater than $C_{tre}$ in turn, and determining that a course change point set $C = C \cup P_i$ under a condition that $C_{cri} > C_{tre}$, wherein M and N represent coefficients;

the considering spatio-temporal characteristics of the AIS data comprises:

(6.1) setting a distance threshold $d_T$, and marking a trajectory in segments with the start point and the end points of the ship trajectory and retained characteristic trajectory points in S, E and C as the initial points, wherein the trajectory between two adjacent trajectory characteristic points is a sub-trajectory segment;

(6.2) connecting start points and end points of each of a plurality of segmented trajectories, and establishing a virtual straight line spatio-temporal trajectory according to coordinates of a Mercator coordinate system converted from a longitude and a latitude of the start point and the end point, and a time; calculating the coordinates of the Mercator coordinate system of the AIS data points on each of the sub-trajectory segment on the virtual straight line spatio-temporal trajectory at the same moment, taking a distance between the coordinates of the Mercator coordinate system of the AIS data points on the sub-trajectory segment and the coordinates of the Mercator coordinate system of the AIS data points on the virtual straight line spatio-temporal trajectory at the same moment as a spatio-temporal distance d from the AIS data points to the virtual straight line spatio-temporal trajectory, finding a maximum distance $d_{max}$ among all of the spatio-temporal distance, and comparing the maximum distance with a preset distance threshold $d_T$.

2. The method according to claim 1, wherein the step (5) comprises:

judging whether a product of values after two adjacent AIS data points are respectively substituted into an area boundary line equation is less than 0, and marking and retaining the two adjacent AIS data points as the trajectory points of the ship entering and exiting from a certain area, which constitute a certain-area entry and exit point set E under a condition that the product is less than 0.

3. The method according to claim 1, the compressing the AIS data comprises:

(6.3) discarding all intermediate data points on the sub-trajectory segment under a condition that $d_{max}<d_T$, and taking a straight line connecting the start point and the end point of the sub-trajectory segment as an approximation of the sub-trajectory segment after all intermediate points are discarded, thus completing a processing of the sub-trajectory segment;

(6.4) retaining the AIS data points corresponding to the maximum distance as a data point on a result trajectory under a condition that $d_{max}>d_T$, dividing the sub-trajectory segment into two parts by the AIS data points corresponding to the maximum distance, and processing the two parts of curves using step (6.2) and step (6.3) until all $d_{max}<d_T$; and (6.5) forming the trajectory by sequentially connecting segmentation points after all the sub-trajectory segment are processed, wherein the trajectory is an approximate trajectory after an original trajectory is compressed.

4. The method according to claim 1, wherein the latitude and longitude coordinates of each of the AIS data points in the single-ship AIS time series data record are converted into the Mercator projection coordinates by $$r_0 = \frac{a \times \cos(\varphi_0)}{\sqrt{1 - (e^2 \times \sin^2(\varphi_0))}}, q = \ln\left(\tan\left(\frac{\pi}{4} + \frac{\varphi}{2}\right) \times \left(\frac{1 - e \times \sin\varphi}{1 + e \times \sin\varphi}\right)^{e/2}\right),$$

$x=r_0 \times \lambda$ and $y=r_0 \times q$, wherein ($\lambda$, $\varphi$) represents the latitude and longitude coordinates of the AIS data points, $r_0$ represents radius of a parallel circle of a standard latitude, and q represents a equidistant latitude, $\varphi_0$ represents the standard latitude of a Mercator projection, a represents long radius of an earth ellipsoid, e represents a first eccentricity of the earth ellipsoid, and (x, y) represents coordinates of a Mercator coordinate system converted from the latitude and longitude coordinates.

5. The method according to claim 1, wherein $M \in [9,11]$, $N \in [3,5]$.

* * * * *